(12) United States Patent
Mathew et al.

(10) Patent No.: US 8,464,337 B2
(45) Date of Patent: *Jun. 11, 2013

(54) SWITCHING AN APPLICATION, USER, AND SECURITY CONTEXT BASED ON DEVICE ORIENTATION

(75) Inventors: Ashvin J. Mathew, Kirkland, WA (US); Eric J. Estroff, Snoqualmie, WA (US); Josef Schauer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/830,506

(22) Filed: Jul. 6, 2010

(65) Prior Publication Data

US 2010/0275256 A1 Oct. 28, 2010

Related U.S. Application Data (63) Continuation of application No. 11/103,392, filed on Apr. 11, 2005, now Pat. No. 7,779,462.

(51) Int. Cl.
*G06F 21/00* (2006.01)

(52) U.S. Cl.
USPC .............................................. 726/17; 713/166

(58) Field of Classification Search
USPC ..................................... 726/17; 713/164, 166
See application file for complete search history.

(56) References Cited

U.S. PATENT DOCUMENTS

| | | | |
|---|---|---|---|
| 5,715,464 A | 2/1998 | Crump et al. | |
| 6,243,258 B1* | 6/2001 | Paratore | 361/679.3 |
| 6,304,248 B1 | 10/2001 | Shiobara et al. | |
| 7,047,092 B2 | 5/2006 | Wimsatt | |
| 7,082,578 B1 | 7/2006 | Fishkin et al. | |
| 7,133,023 B2* | 11/2006 | Brebner | 345/156 |
| 7,148,877 B2 | 12/2006 | Chang et al. | |
| 7,162,629 B2 | 1/2007 | Zimmer et al. | |
| 7,242,385 B2* | 7/2007 | Kojo | 345/156 |
| 7,289,102 B2 | 10/2007 | Hinckley et al. | |
| 7,302,280 B2 | 11/2007 | Hinckley et al. | |
| 7,352,567 B2 | 4/2008 | Hotelling et al. | |
| RE40,340 E | 5/2008 | Ghaly | |
| 7,437,765 B2 | 10/2008 | Elms et al. | |
| 7,962,426 B2* | 6/2011 | Pall et al. | 706/11 |
| 2002/0021278 A1* | 2/2002 | Hinckley et al. | 345/156 |
| 2002/0040377 A1 | 4/2002 | Newman et al. | |
| 2002/0116632 A1* | 8/2002 | Itoh et al. | 713/200 |
| 2002/0173340 A1 | 11/2002 | Watanabe | |
| 2003/0037237 A1* | 2/2003 | Abgrall et al. | 713/166 |
| 2003/0085870 A1* | 5/2003 | Hinckley | 345/156 |
| 2003/0112588 A1* | 6/2003 | Shimano | 361/683 |
| 2003/0179182 A1 | 9/2003 | Lieu | |
| 2004/0004667 A1 | 1/2004 | Morikawa et al. | |
| 2004/0015729 A1 | 1/2004 | Elms et al. | |
| 2004/0039924 A1* | 2/2004 | Baldwin et al. | 713/189 |

(Continued)

*Primary Examiner* — David Garcia Cervetti (57) ABSTRACT

A computer is adapted for changing one or more of the application, security, or user contexts based on the orientation of a component, such as a monitor. Changing the context responsive to the reorientation allows two or more users to use the same hardware to complete a transaction requiring at least two perspectives, for example, buyer and seller. In the background, transaction end points may be changed as well as establishment of a secure channel for supporting confidentiality of a user and their personal information. The computer so equipped may be applicable to many situations involving two parties, such as hospitals, personnel/human relations, banking, government benefits, and retail.

20 Claims, 5 Drawing Sheets

U.S. PATENT DOCUMENTS

| | | |
|---|---|---|
| 2004/0078636 A1 | 4/2004 | Suzaki |
| 2004/0103323 A1 | 5/2004 | Dominic |
| 2004/0140967 A1* | 7/2004 | Kojo .............................. 345/204 |
| 2004/0227724 A1 | 11/2004 | Chang et al. |
| 2004/0230797 A1* | 11/2004 | Ofek et al. .................... 713/168 |
| 2004/0236974 A1 | 11/2004 | Brown et al. |
| 2005/0044375 A1* | 2/2005 | Paatero et al. ................ 713/176 |
| 2005/0078086 A1* | 4/2005 | Grams et al. .................. 345/158 |
| 2005/0091431 A1* | 4/2005 | Olodort et al. .................. 710/72 |
| 2006/0085864 A1* | 4/2006 | Chang et al. ..................... 726/34 |
| 2006/0146013 A1* | 7/2006 | Arneson et al. ............... 345/156 |
| 2006/0173936 A1 | 8/2006 | Castro et al. |
| 2006/0267947 A1 | 11/2006 | Nishiyama et al. |
| 2008/0009330 A1 | 1/2008 | Jung et al. |

* cited by examiner

Fig. 6 though only the presentation of the
SWITCHING AN APPLICATION, USER, AND SECURITY CONTEXT BASED ON DEVICE ORIENTATION This is a continuation of U.S. application Ser. No. 11/103,392, filed on Apr. 11, 2005 and issued on Aug. 17, 2010 as U.S. Pat. No. 7,779,462, the entire disclosure of which is incorporated herein by reference.

TECHNICAL FIELD

This disclosure relates generally in the field of computers and, more particularly, to switching an application, user and security context based on device orientation.

BACKGROUND

Computer monitors that adjust an image based on screen orientation are known. As early as the late 1980s monitors were available that would adjust from portrait to landscape mode when the monitor was moved from an upright to a horizontal position. The result was that the text was rotated and, in some cases, the screen image was scaled to fit on the screen.

The computers incorporating these earlier monitors were sensitive to the change in orientation from within a single application. That is, the active application responded to the change in orientation to support the new viewing mode. However, the application changed only the presentation of the current data. If a user was entering text at a certain point in a document, the text entry point would be unchanged after an orientation change.

SUMMARY

A computer system in accordance with the current disclosure is adapted to change more than the application view when a component of the system is re-oriented. Beyond changing an application context view, the computer system may change the active application, the user context, and the security context in response to reorientation of a component, for instance, a monitor or flat panel display. In a retail environment, the display may be facing a clerk while items are checked. When all the items are checked, the screen may be turned to face a customer. While the screen is being reoriented, the application and security contexts may be changed to reflect that the user is no longer the clerk, but the customer. The customer may be presented with an approval screen representing a secure connection to an acquiring bank. After completing the purchase transaction, for example, by entering a personal identification number ("PIN"), the display may be returned to its original position, thereby re-establishing the clerk as the user.

The context change is more than bringing up a new screen with a payment entry. The customer may be locked out of the retail terminal mode, a secure channel may be established if required, and the payment screen activated. Similarly, when returning the display, the clerk should not be able to see or surmise the PIN number, if used or any other personal data associated with the customer's side of the transaction. Any applications or secure channel established may be torn down with no remnants that could be analyzed or exploited.

In this manner, the number of dedicated displays may be reduced in many situations where two or more participants are involved in a transaction, e.g., hospitals, personnel/human relations, banking, government benefits, and, as discussed already, retail.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
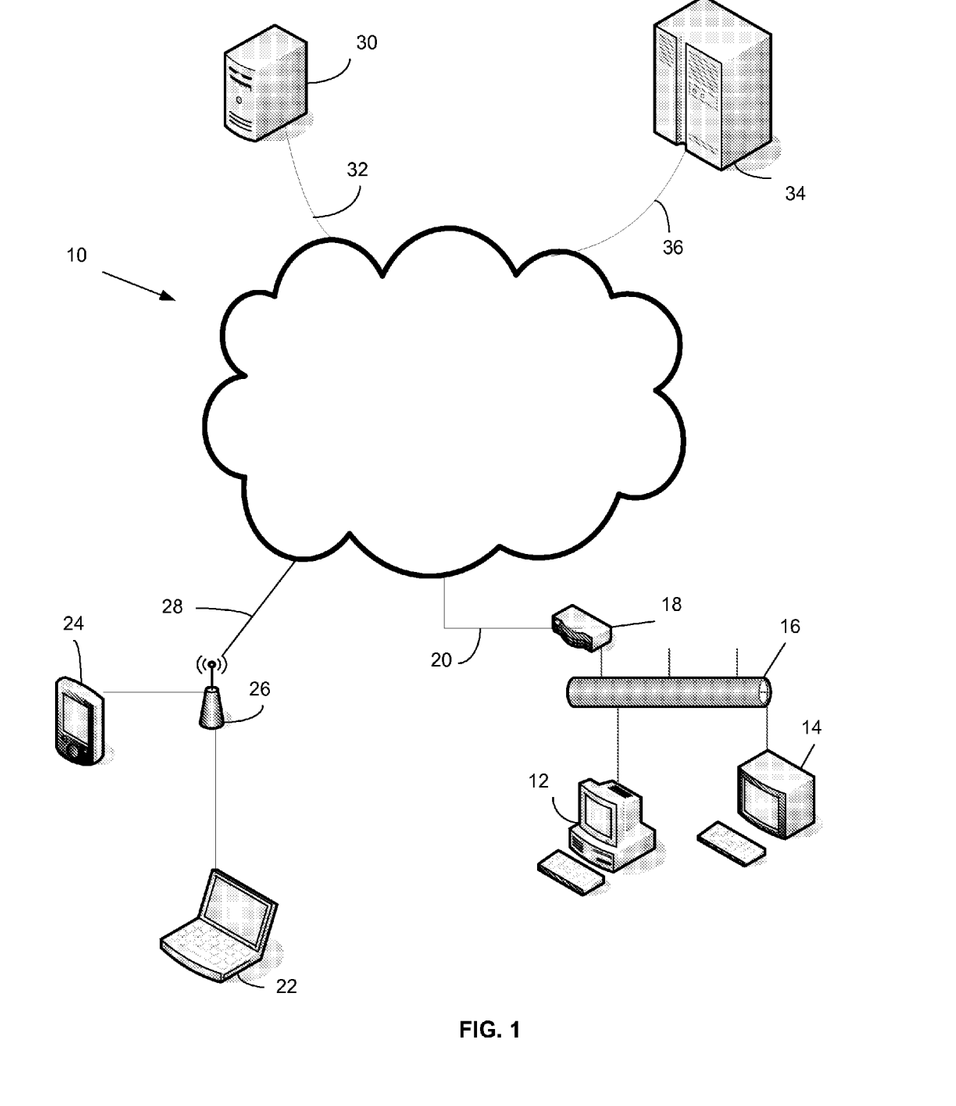
FIG. 1 is a simplified and representative block diagram of a computer.

FIG. 1 illustrates a computer network 10. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
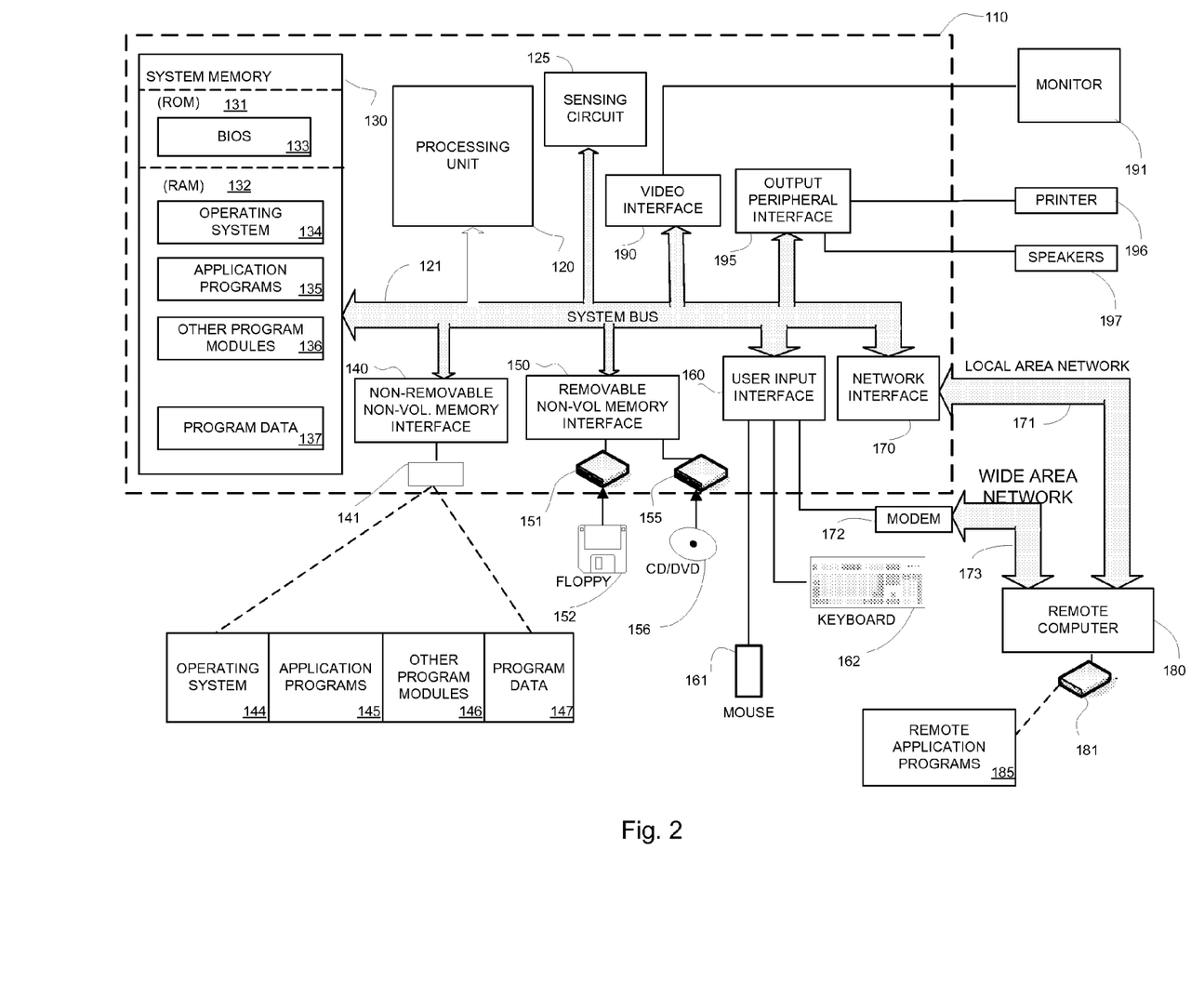
FIG. 2 is a block diagram of a simplified isolated computing environment.

FIG. 2 illustrates a computing device in the form of a computer 110 that may be connected to the network 10. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may include a sensing circuit 125 for determining the orientation of a peripheral or other component of the computer 110. The sensing circuit 125 is discussed in more detail with respect to FIG. 5, below.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3A:
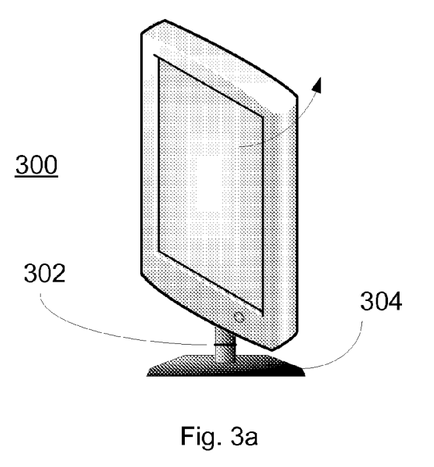
FIG. 3 is a representative view of a display adapted for device orientation switching.
Figure 3B:
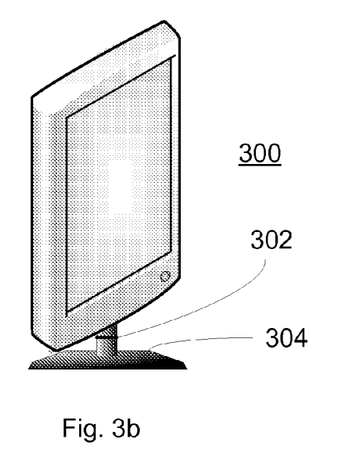

FIGS. 3a, 3b, 4a and 4b depict an embodiment where a display, such as monitor 191, is the component that is monitored for movement to trigger a change in operation in a computer. The display 300 is shown in FIG. 3a in a first position. The same display 300 in FIG. 3b is shown in a second position, rotated relative to the first position. A pivot 302 may include a sensor (not depicted), for example a switch or potentiometer that may be used to indicate the position or orientation of the display 300 relative to the base 304.

Figure 4A:
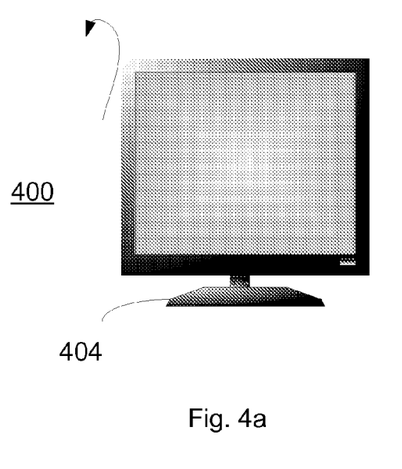
FIG. 4 is another representative view of a display adapted for device orientation switching.
Figure 4B:
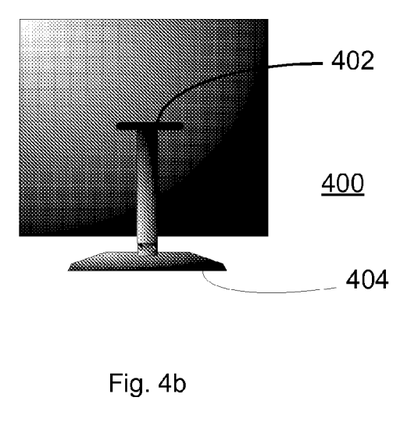

The display 400 in FIG. 4a is shown in a first position. The display 400 in FIG. 4b is moveably coupled to a pivot 402. The display 400 shown in FIG. 4b is in a second position, flipped over relative to the base 402. A sensor (shown in FIG. 5), for example a switch or potentiometer, optical sensor, etc. may be used to indicate the orientation of the display 400 relative to the base 404.

Figure 5:
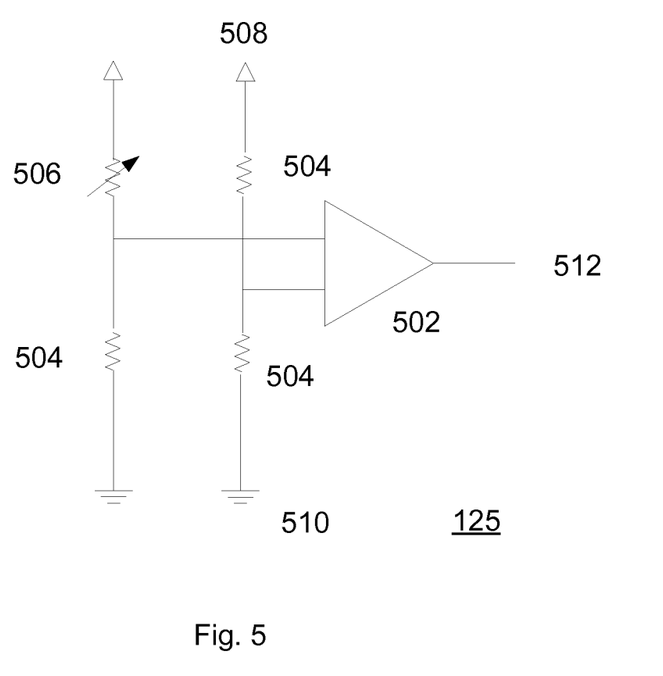
FIG. 5 is a simplified circuit for detecting orientation of a component of a computer.

FIG. 5 shows a simplistic exemplary embodiment of sensing circuit 125 for use in indicating the orientation of a component of the computer 110, such as display 300. The circuit 500 shown has a comparator 502, and three equal value biasing resistors 504. A sensor 506, depicted as a potentiometer, may be mechanically coupled to the component whereby movement of the component causes the resistive value of the sensor 506 to vary. By biasing the circuit between power 508 and ground 510 the output 512 of the comparator 502 may alternate between a logic high and a logic low depending on the value of the sensor 506 relative to the value of resistors 504. Therefore, when the component is moved, the value of the sensor 506 may be varied around the value of the resistors 504, causing the output to reflect the orientation of the component.

Other embodiments of the sensing circuit 125 may vary to include a transition zone, wherein the display is blanked or disabled so that data displayed in one orientation may not be viewed by a person aligned with another orientation. In this embodiment a more linear signal or digital value reflecting more positions may be employed.

In operation, the processing unit 120 may monitor the sensor 506 to determine the orientation or position of a component coupled to the computer 110. For the sake of example, the component may be the display 300, but any other component, such as a movable mounting bracket, that may be monitored for orientation may be used. Ultimately, the goal is to determine which of several users is likely to be in position to interact with the computer 110.

In one embodiment, the component, for example, the display 300, may be adapted for use in two orientations, a first orientation for facing a person primarily involved in data entry, such as a retail clerk entering purchased items. The other orientation for facing a person primarily involved in authorizing or approving a payment, such as a customer. Other data entry roles may include a supervisor, an administrator, a person performing human relations activities, etc. Other authorizing or approving roles may include an employee, a patient, a parent acting on behalf of a minor, etc.

The computer 110 may store in memory, for example memory 130 or hard disk drive 141 data corresponding to a plurality of user contexts. Each user context may include data about both the user and the role of the user. For example, using the retail example, the clerk may have a specific user identity, such as clerk #5. A functional identity may further identify an operating environment, for example, register #2. Given the environment of clerk #5 and user #2, a first user context may be defined that describes an application, user rights, and security for that operating environment. A second user context may be defined for a customer, also defining an application, user rights, security and perhaps a destination, such as an acquiring bank, for the customer.

An initial set-up process may be used to determine the first and second user positions, the orientation of the component, such as display 300, with respect to the user positions and any transition region where data should be suppressed. The set-up may further include identifying appropriate processes, such as secure channel setup, for initiation while the component is in motion in a particular direction.

After initial setup, the processing unit 120, responsive to the sensor 506, may select an active user context from the plurality of user contexts appropriate to a user associated with that orientation of the component.

The processing unit 120 may execute a first module stored in memory 130 141 for monitoring the orientation of the component, such as display 300. In an alternate embodiment, a moveable base, similar to the base 304 shown in FIG. 3, may contain the sensor 506 and allow more than the display 300, including the whole computer, to be re-oriented between users. The processing unit 120 may be physically coupled to the sensor 506, via the sensing circuit 125. In another embodiment, the sensor 506 and processing unit 120 may be logically coupled, for example, by a wireless connection. The processing unit 120, executing the first module, may interpret the sensor data to determine not only first user and second user zones but any transition zone that may have been provided in the set-up process.

When a change in position is observed, for example, by the first module, the processing unit 120 may then activate a second module stored in memory 130 141 for activating a security context responsive to a change in the orientation of the component. Since the authorization or authentication process may be distinguished from an associated data entry process the corresponding security requirements may be different as well. A new communication channel may be established to support data transfer to a database or different database from that previously in use. A secure channel, such as a secure sockets level 2 (SSL2) channel may be established between the computer 110 and a remote site. The change in security context may be used to establish an audit trail that distinguishes actions in the data entry function from actions in the authentication/authorization function.

Additionally, the change in orientation of the component may cause the processing unit 120 to execute a third module to activate a user context. The user context may include a user identity, as described above and may set the operation of the computer to accept data from a data entry user as opposed to an authorization/authentication user. This may include an implicit or explicit login process.

A fourth module may be executed by the processing unit 120 for activating an application responsive to a change in the orientation of the component of the computer. The application may serve up the user interface as well as support the authentication of the computer 110 with a downstream host, such as server 30 of FIG. 1. The application may be a client in a client-server relationship, or may be a stand-alone application that communicates with an internal or locally-accessed database. A number of applications may be available for selection based on different combinations of user, function and role. In one embodiment, a first application may be a data entry application and another application may be an approval application.

Any or all of the modules above may be authenticated via digital signature to reduce the chance that a rogue or malicious application could be presented to a user. In verifying the modules, the computer 110 may use public key cryptography and locally stored keys to determine authenticity, or the computer 110 may use an online resource, such as a certificate authority, for verification.

Figure 6:
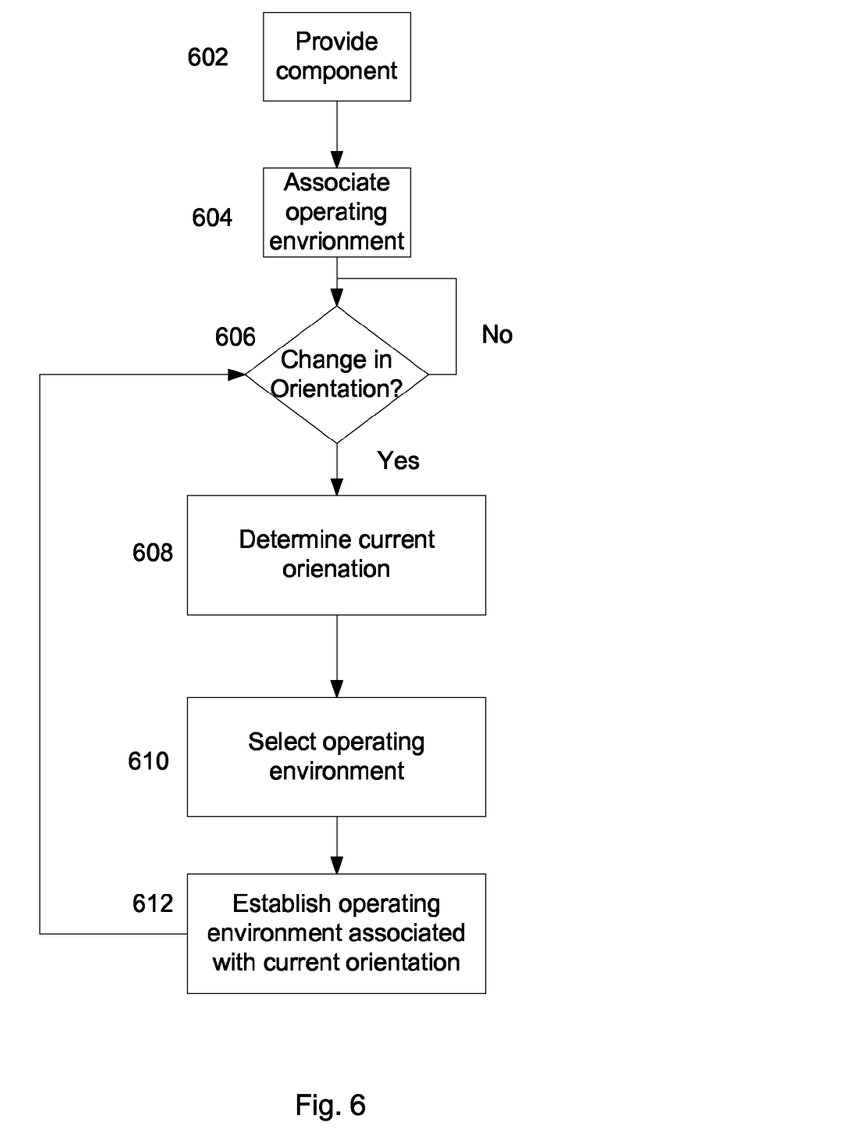
FIG. 6 is a flow chart depicting a method changing an application, user or security context based on component orientation.

FIG. 6, a flow chart depicting a method of changing an application, user or security context based on component orientation will be discussed and described. A component of a computer may be provided 602, where the component is adapted for use in a plurality of orientations. For example, the displays of FIG. 3 and FIG. 4 may be moved to different orientations. Other components, such as a moveable base similar to the moveable base 304 of FIG. 3 may be used to re-orient the entire computer 110 and peripherals or peripherals only, such as the mouse 161, keyboard 162, and monitor 191.

One or more operating environments may be associated 604 with each of the plurality of orientations of the component. Each of the operating environments may include a first user context or a second user context, where each of the operating environments may comprise an application context and a security context. The operating environment may also include a user identity. As discussed above, the user identity may be that of a an actual person using the system or may represent a function-defined user, or role-based identity, such as a clerk or a customer. The operating environments associated with each of the plurality of orientations may also include a data entry context and an approval context. The data entry context may require a different application, user interface and/or security considerations when compared to the approval context.

The computer 110 may monitor 606 data from a sensor, such as sensor 506 to determine a current orientation of the component from the plurality of orientations of the component. When no change has been made, the operation may take the no branch from block 606 and may continue to monitor 606 the sensor 506. In another embodiment, a change in sensor data may trigger an interrupt for detection of the change in orientation. When a change in orientation of the component is detected, execution may continue at block 608 where the current orientation may be determined.

The computer 110, based on an initial setup performed locally or at the time of manufacture may then select 610 an appropriate operating environment associated with the current orientation of the component. As discussed above, by analyzing the current and previous position data, a direction of movement may be established and a new orientation of the component may be anticipated, allowing latency to be reduced for the new user context. In addition, the current user context may be analyzed to determine the appropriate new user context. Continuing the retail example, the approval operating environment may be different when the data entry environment is for a purchase as opposed to a return/refund. Similarly, the approval operating environment, user context, or data captured may affect the next data entry environment. Thus a combination of factors may be used to determine the new user context.

After selecting 610 an appropriate operating environment, the computer 110 may activate 612 one or more program modules to establish the operating environment associated with the current orientation of the component. After the new operating environment is established, execution may continue at block 606 to monitor for the next change in orientation.

While most of the discussion above has centered on two positions of the component to determine the operating environment, more than two positions can be implemented, limited only by the number of physical positions that can be accommodated around the component.

By allowing the operating environment, including application, user and security contexts to be automatically activated based on the orientation of a component of a computer 110, such as a display 300 or display 400, businesses and other entities may be able to reduce their capital equipment investment in point-of-sale and point-of-capture stations. The ability to select new user and security contexts with no other operator intervention, other than moving the component, significantly reduces the need for cumbersome and risk-prone login operations. The data-entry operator has no need to know or have access to higher privileged login data for use when switching between operating contexts. Similarly, the authorization/authentication user is presented with a user context tailored to his or her particular need. The use of transition zones may be effective in ensuring that the user contexts are not viewed, tampered or otherwise compromised during the transition from one operating environment to another.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of adapting a computer for use in multiple operating environments, the method comprising:
    associating, on the computer, each of the multiple operating environments with a respective orientation of a component integral to the computer, the component being adapted for use in at least a first orientation and a second orientation;
    activating, on the computer, a first operating environment associated with the first orientation in response to orientation of the component in the first orientation, the first operating environment supporting a first application selected based on a first combination of user, function, and role;
    detecting reorientation of the component to the second orientation; and
    automatically activating, on the computer, a second operating environment associated with the second orientation, the second operating environment supporting a second application selected based on a second combination of user, function, and role.

2. The method of claim 1, wherein automatically activating the second operating environment comprises switching between a data entry application and an approval application based on component orientation.

3. The method of claim 1, wherein automatically activating the second operating environment comprises changing a role-based user identity based on component orientation.

4. The method of claim 1, wherein automatically activating the second operating environment comprises changing a security context based on component orientation.

5. The method of claim 1, wherein automatically activating the second operating environment comprises changing a function-defined user identity based on component orientation.

6. The method of claim 1, wherein the first operating environment supports entry of data by a user of the computer, and the second operating environment supports transfer of the data from the computer to a remote server.

7. A computer comprising:
a processing unit for executing computer-executable instructions; and
memory storing computer-executable instructions for:
associating each of a plurality of operating environments with a respective orientation of a display of the computer, the display being adapted for use in at least a first orientation and a second orientation;
activating a first operating environment in response to orientation of the display in a first orientation, the first operating environment supporting a first application selected based on a first combination of user, function, and role;
detecting reorientation of the display to the second orientation; and
automatically activating a second operating environment associated with the second orientation, the second operating environment supporting a second application selected based on a second combination of user, function, and role.

8. The computer of claim 7, wherein the memory further stores computer-executable instructions for causing the display of the computer to be blank in a transition zone between the first orientation and the second orientation.

9. The computer of claim 7, wherein automatically activating the second operating environment comprises changing a function-defined user identity based on orientation of the display.

10. The computer of claim 7, wherein automatically activating the second operating environment comprises switching between a data entry application and an approval application based on orientation of the display.

11. The computer of claim 7, wherein automatically activating the second operating environment comprises changing a security context based on orientation of the display.

12. The computer of claim 7, wherein the display is integral to the computer.

13. The computer of claim 7, wherein automatically activating the second operating environment comprises changing a role-based identity based on orientation of the display.

14. A computer-readable storage device storing computer-executable instructions that, when executed by a computing device, cause the computing device to perform a method of comprising:
associating each of a plurality of operating environments with a respective orientation of the computing device;
activating a first operating environment in response to a first orientation of the computing device, the first operating environment supporting a first application selected based on a first combination of user, function, and role;
detecting reorientation of the computing device to a second orientation of the computing device; and
automatically activating a second operating environment associated with the second orientation of the computing device, the second operating environment supporting a second application selected based on a second combination of user, function, and role.

15. The computer-readable storage device of claim 14, wherein the method further comprises opening a secure communication channel between the computing device and a remote server when the computing device is in the second orientation.

16. The computer-readable storage device of claim 15, wherein the remote server is in communication with the computing device over a wireless link.

17. The computer-readable storage device of claim 14, wherein the method further comprises:
verifying a digital signature of the second application; and
launching the second application when the digital signature is verified.

18. The computer-readable storage device of claim 14, wherein automatically activating the second operating environment comprises changing a security context based on orientation of the computing device.

19. The computer-readable storage device of claim 14, wherein automatically activating the second operating environment comprises changing a function-defined user identity based on orientation of the computing device.

20. The computer-readable storage device of claim 14, wherein automatically activating the second operating environment comprises changing a role-based user identity based on orientation of the computing device.

* * * * *